США005707293A

United States Patent [19]

Itoh et al.

[11] Patent Number: 5,707,293
[45] Date of Patent: Jan. 13, 1998

[54] SLIDE TYPE UNIVERSAL JOINT

[75] Inventors: Takashi Itoh; Shigeo Kurita; Nobuo Shimizu; Yasuhiro Kawashima; Junichi Suto, all of Tochigi, Japan

[73] Assignee: Honda Giken Kogyo Kabushiki Kaisha, Tokyo, Japan

[21] Appl. No.: 444,877

[22] Filed: May 19, 1995

[51] Int. Cl.⁶ .................................................. F16D 3/205
[52] U.S. Cl. .......................... 464/111; 464/123; 464/905
[58] Field of Search ................................. 464/111, 120, 464/122, 123, 124, 125, 132, 905

[56] References Cited

U.S. PATENT DOCUMENTS

| 4,578,048 | 3/1986 | Hirai et al. ............... 464/111 |
| 4,747,803 | 5/1988 | Kimata et al. ............ 464/111 |
| 4,810,232 | 3/1989 | Farrell et al. .......... 464/123 X |
| 4,886,479 | 12/1989 | Richtmeyer et al. ..... 464/905 X |
| 4,891,035 | 1/1990 | Sasaki et al. . |
| 5,167,583 | 12/1992 | Bensinger et al. . |
| 5,376,049 | 12/1994 | Welschof et al. ....... 464/905 X |
| 5,395,289 | 3/1995 | Damian ................... 464/111 |
| 5,411,440 | 5/1995 | Bensinger et al. ....... 464/111 |

FOREIGN PATENT DOCUMENTS

| 095333 | 3/1993 | European Pat. Off. ......... 464/111 |
| 2 668 804 | 5/1992 | France . |
| 89 15 669.2 | 1/1991 | Germany . |
| 214915 | 7/1993 | Germany ................... 464/111 |
| 43 27 606 A1 | 2/1995 | Germany . |
| 56-47413 | 11/1981 | Japan . |
| 57-13211 | 3/1982 | Japan . |
| 61-171922 | 8/1986 | Japan . |
| 2 259 557 | 3/1993 | United Kingdom . |
| 2 268 789 | 1/1994 | United Kingdom . |
| 2 273 332 | 6/1994 | United Kingdom . |
| WO 91/15682 | 10/1991 | WIPO . |

*Primary Examiner*—Michael Mansen
*Assistant Examiner*—Eileen A. Dunn
*Attorney, Agent, or Firm*—Nikaido Marmelstein Murray & Oram LLP

[57] ABSTRACT

In a slide type universal joint, a slider is slidably fitted around a trunnion of an inner member and a roller, which rolls in a transmission groove of an outer member, is carried rotatably on the slider via a needle bearing, the slider and the roller being coupled together against axial relative displacement by an axial coupling means. This makes the joint simple in structure and reduces frictional resistance.

1 Claim, 4 Drawing Sheets

SLIDE TYPE UNIVERSAL JOINT

BACKGROUND OF THE INVENTION

1. Field of the Invention

The field of the present invention is slide type universal joints of a type used in a bent portion of a bendable wheel drive axle for a front-wheel drive automobile, for example, and particularly, such universal joints as comprising a tubular or hollow cylindrical outer member connected to one transmission shaft and formed at its inner peripheral surface with a plurality of circumferentially spaced, axially extending transmission grooves, an inner member connected to another transmission shaft and having a plurality of trunnions which extend radially so as to project into the plurality of transmission grooves, and rollers carried on respective trunnions and rollably engaged in the corresponding transmission grooves.

2. Description of the Prior Art

There are conventionally known joints of this type, such as shown in FIG. 5, in which a roller e is rotatably and slidably fitted around an outer periphery of a trunnion d of an inner member b via a needle bearing f. This type of joint has a simple structure, however, there are demerits that when the inner member b and mating outer member a are rotated in a condition with their axes crossed at an angle, the roller e is caused to slide in transmission groove C while rotating relative to the trunnion d so that a frictional force acts on needles of the needle bearing f in the rotational and axial directions, tending to cause a skew (or declining) phenomenon that results in a power loss, heating, vibration and the like.

Improved joints for eliminating the mentioned demerits are also known, such as disclosed in Japanese Patent Publications No. 47413/81 and No. 13211/82 and U.S. Pat. No. 4,891,035, for example.

In case of the improved joints, as shown in FIG. 6, an inner guide ring g is slidably fitted around a trunnion d and an outer guide ring h is fitted around the inner guide ring g with a spherical contact provided therebetween, a roller e being rotatably carried on the outer guide ring h via a needle bearing i, wherein the roller e is swingable relative to the trunnion d. Accordingly, this type of joint has an advantage that even when the outer member a and the inner member b rotate with their axes inclined with respect to each other, the roller e does not incline but can roll within the transmission groove c smoothly without causing a slip. This joint, however, has problems that the number of parts increases, the structure is complicated, the weight increases and the cost becomes relatively high.

The present invention has been proposed in view of these circumstances and an object thereof is to provide a slide type universal joint of the afore-mentioned type which is simplified in structure and has excellent properties.

SUMMARY OF THE INVENTION

In order to achieve the above object, the invention provides a slide type universal joint having a roller rotatably carried on an outer periphery of a slider via a needle bearing, wherein the slider and the roller are axially coupled to each other by an axial coupling means thereby to form a slide roller assembly.

With the above arrangement, when the trunnion inclines, the slider is caused to slide relative to the trunnion thereby to prevent a frictional force from acting on the bearing in the axial direction. As a result, the bearing can operate normally at all times and the roller can roll smoothly in a transmission groove so that generation of any vibration due to frictional resistance can be avoided. Moreover, since the roller assembly can be formed of a small number of parts so that the structure can be made simple and obtained at a low cost and the weight can be reduced.

Further, in addition to the above arrangement, if chamfers are provided on inner peripheral edges of the slider at axial opposite ends thereof, an advantage is obtained in that generation of a pinching in the trunnion can be prevented even if the slider is formed short in the sliding direction. Use of a short slider contributes to making the roller assembly compact.

Further, if said axial coupling means comprises washers opposed to and placed in contact with axial end surfaces of the roller, and retaining rings retained in annular grooves formed on an outer peripheral surface of the slider and abutted against outer side surfaces of the washers, the coupling means can be obtained easily at a low cost. Moreover, this means can be mounted by merely forming the slider slightly longer than the roller in the axial direction.

The above and other objects, features and advantages according to the invention will be apparent from reading of the following detailed description of a preferred embodiment in conjunction with the accompanying drawings.

DETAILED DESCRIPTION OF PREFERRED EMBODIMENT

One embodiment according to the present invention will be described hereinafter with reference to the accompanying drawings.

Figure 1:
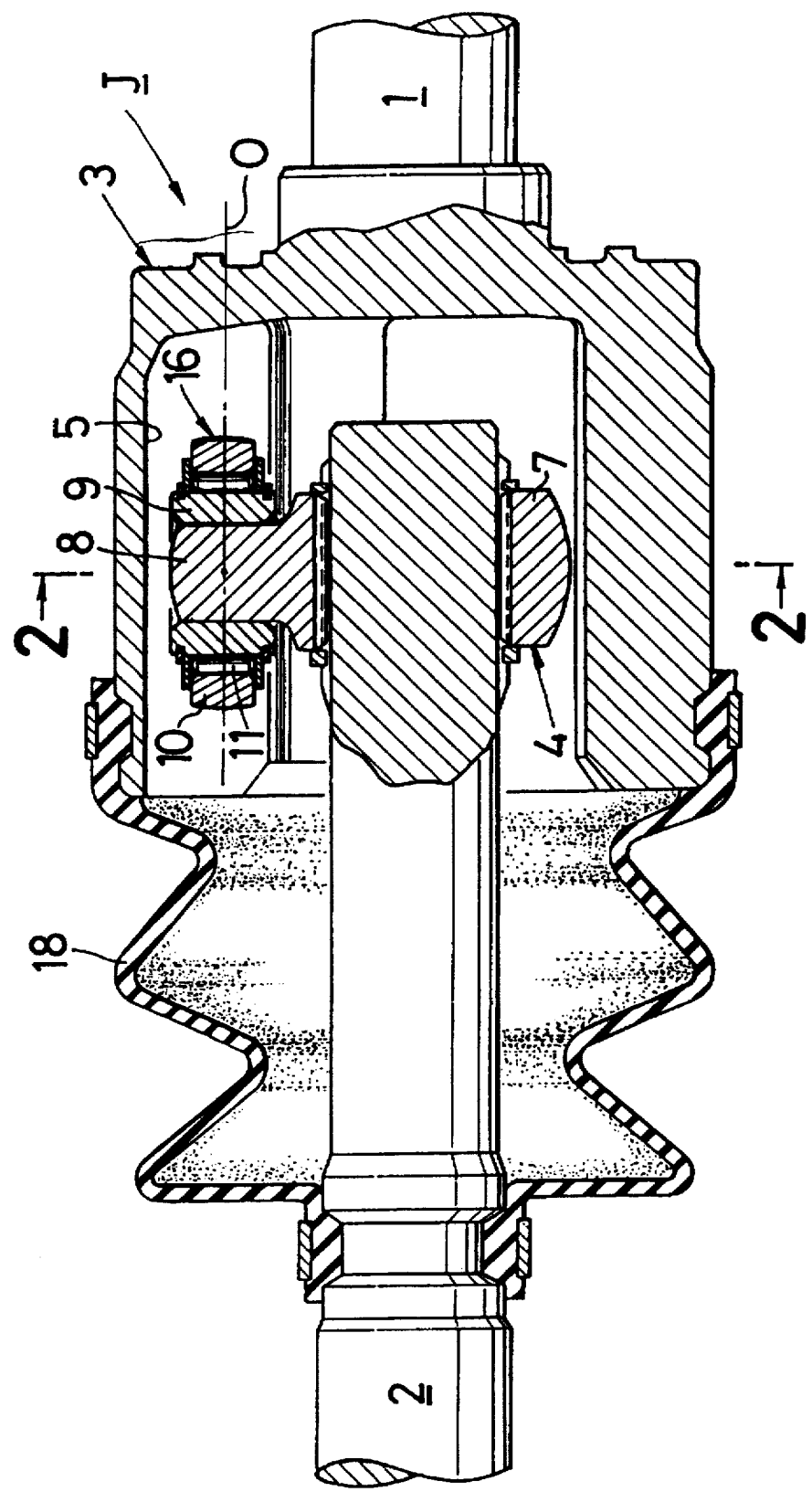
FIG. 1 is a longitudinally sectioned side view of a slide type universal joint according to one embodiment of the invention.
Figure 2:
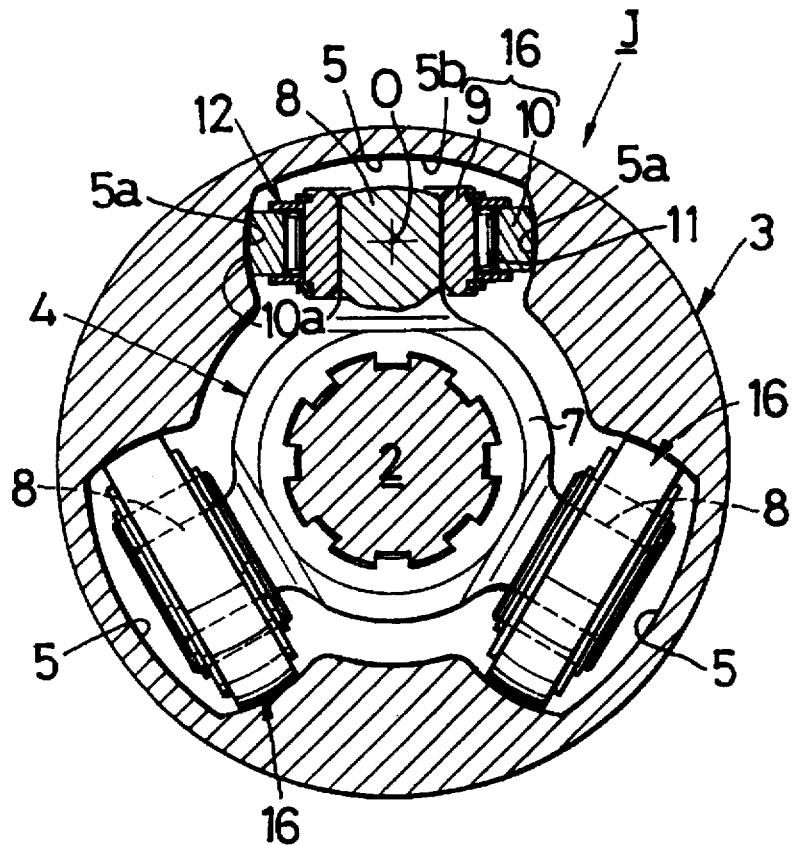
FIG. 2 is a sectional view taken along a line 2—2 of FIG. 1.

Referring first to FIGS. 1 and 2, two transmission shafts 1 and 2 are connected to each other via a slide type universal joint J according to this embodiment. The joint J includes, as primary elements, a tubular or hollow cylindrical outer member 3 integrally connected to an end portion of one transmission shaft 1 and having an open fore end surface, and an inner member 4 connected to an end portion of the other transmission shaft 2 and accommodated inside the outer member 3. The outer member 3 is provided at its inner peripheral surface with a plurality of (three in this embodiment) axially extending transmission grooves 5 which are circumferentially spaced from each other at equal intervals. Each transmission groove 5 comprises left and right inner side walls 5a, 5a having such arcuate surfaces that the center of the surfaces is located centrally between the side walls and coincides with the central axis 0 extending parallel to the axis of the outer member 3, and a bottom surface 5b formed as an arcuate surface having its center located on the axis of the outer member 3 (see also FIG. 3).

On the other hand, the inner member 4 has a boss 7 and, integrally on an outer peripheral surface of the boss, a plurality of (three in the embodiment) trunnions 8 which project into the mentioned transmission grooves 5, respectively. A cylindrical slider 9 is fitted around an outer periphery of each trunnion 8 in an axially slidable manner. A roller 10 is carried on an outer periphery of the slider 9 via a needle bearing 11 and the roller 10 is held in rollable engagement with the corresponding transmission groove 5. More specifically, the needle bearing 11 is inserted between the slider 9 and roller 10 such that it is in contact with the outer peripheral surface of slider 9 and the inner peripheral surface of roller 10. An axial coupling means 12 is provided between the slider 9 and the roller 10 to couple those elements axially and prevent their axial relative displacement.

Figure 3:
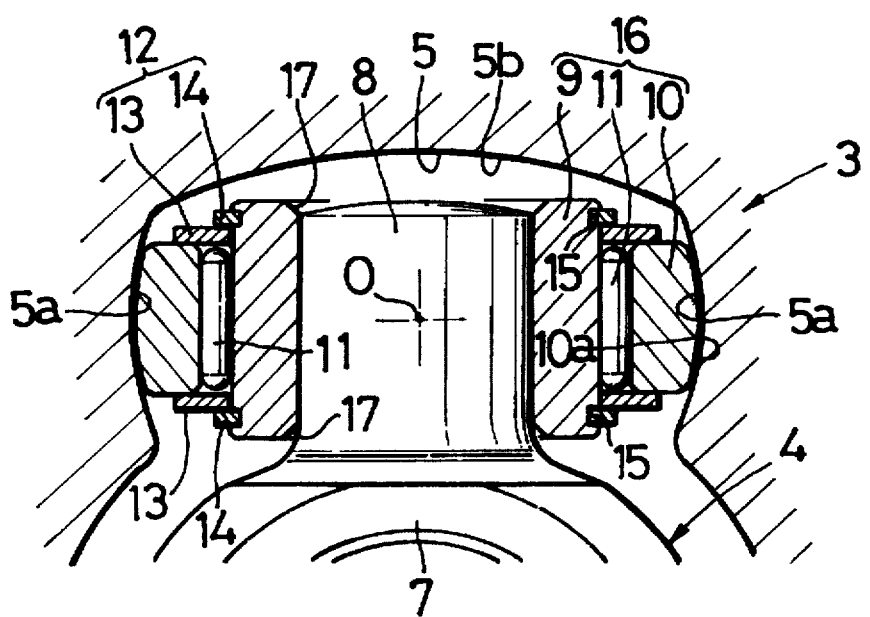
FIG. 3 is an enlarged view of an essential portion of FIG. 1.

The axial coupling means 12 comprises, as shown in FIG. 3, a pair of washers 13, 13 opposed to and placed in contact with axial opposite end surfaces of the slider 9 and roller 10 and a pair of retaining rings or cir-clips 14, 14 which abut against outer side surfaces of the washers 13, 13, respectively. The cir-clips 14, 14 are retained in a pair of annular grooves 15, 15, respectively, which are formed on the outer peripheral surface of the slider 9 at its axial opposite end portions. The slider 9, roller 10 and needle bearing 11 thus together constitute a slide roller assembly 16. Accordingly, when the joint J is to be assembled, the slide roller assembly 16 is previously assembled as a unit and mounted on each trunnion 8.

Referring further to FIG. 3, the roller 10 has an outer peripheral surface 10a of a part spherical configuration with its center being located on the central axis 0 so that the roller 10 is capable of inclining around the central axis 0. The cylindrical slider 9 is provided with a chamfer 17 defining a conical or bugle shape on its inner peripheral edge at each of axial opposite ends thereof.

Incidentally, reference numeral 18 in FIG. 1 denotes a flexible boot extended over the outer member 3 and the transmission shaft 2 for covering the open end of the outer member 3.

The operation of this embodiment will now be described. If rotational torque is applied to one transmission shaft 1, for example, the torque is transmitted from the outer member 3 to the inner member 4, in other words, from one inner side wall 5a of transmission groove 5 of the outer member 3 through the roller 10, needle bearing 11 and slider 9 to the trunnion 8 of inner member 4 and then through the boss 7 to the other transmission shaft 2.

Figure 4:
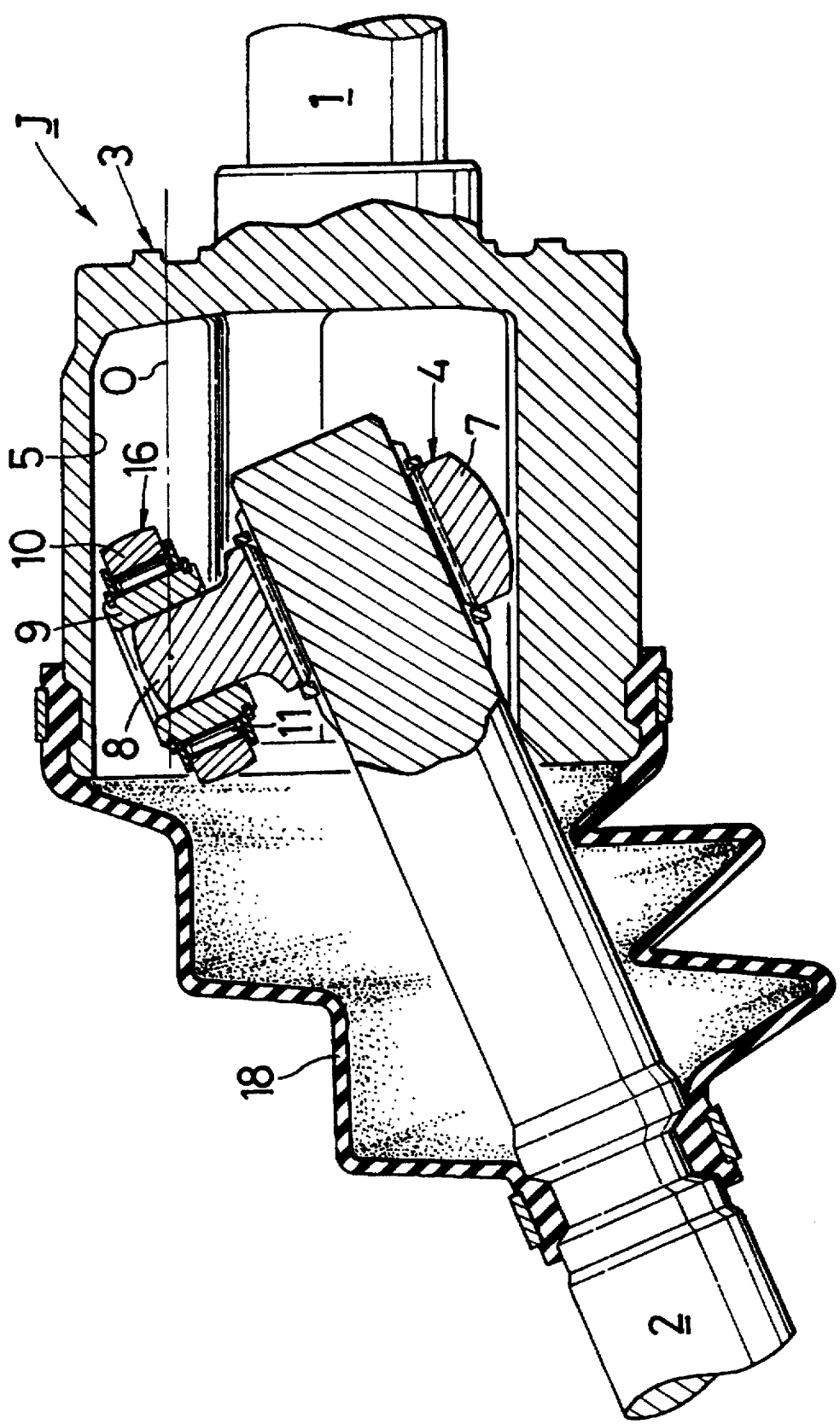
FIG. 4 is a sectional view corresponding to FIG. 1, but showing an operating state of the joint in a bent state.
Figure 5:
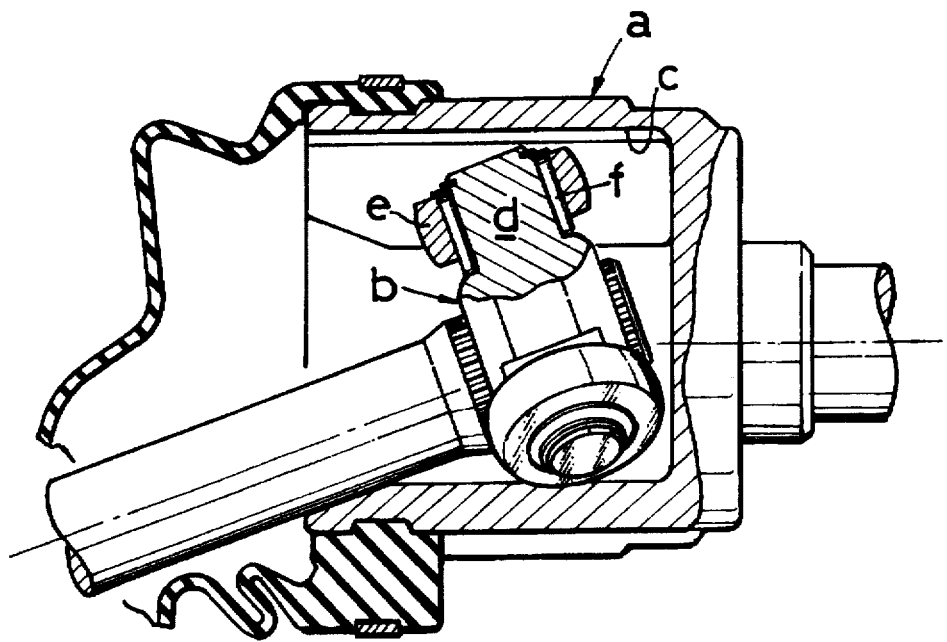
FIG. 5 is a longitudinally sectioned side view of a conventional slide type universal joint.
Figure 6:
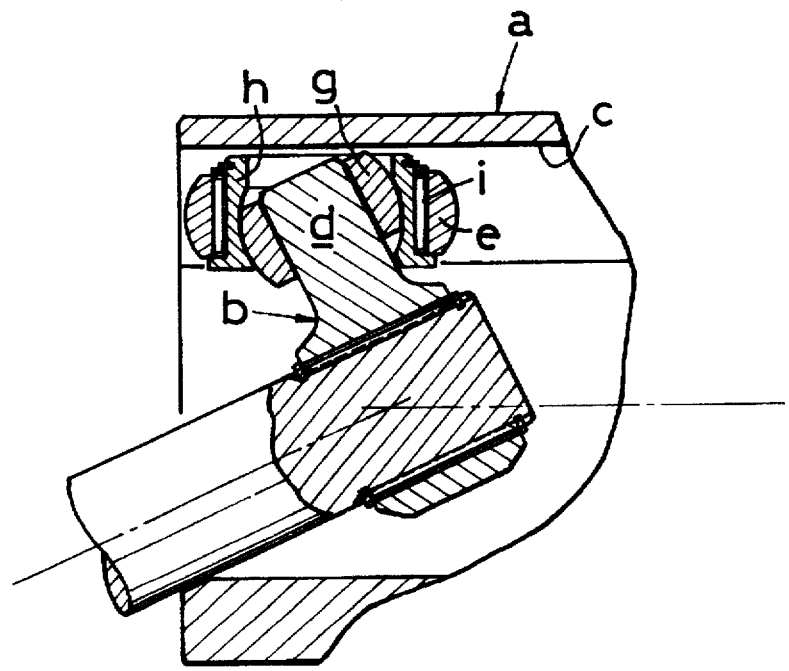
FIG. 6 is a longitudinally sectioned side view of another conventional slide type universal joint.

As particularly shown in FIG. 4, when the transmission of torque is conducted between both the transmission shafts 1, 2 in a bent state wherein their axes to cross each other at an angle, the trunnion 8 repeats its inclining movement following the rotations of transmission shafts 1, 2 and hence the slide roller assembly 16 carried on the trunnion 8 inclines simultaneously. In this state, the center of inclination of the slide roller assembly 16 is forced to move along the central axis 0 of the transmission groove 5 due to the engagement between the part spherical outer surface 10a of roller 10 and the arcuate inner side walls 5a, 5a of transmission groove 5. Moreover, since in the slide roller assembly 16 any axial relative displacement between the slider 9 and roller 10 is prevented by the axial coupling means 12, the inclination of the trunnion 8 and of the slide roller assembly 16 results in generation of a sliding displacement between the trunnion 8 and the slider 9, whereby any frictional force is prevented from acting on the needle bearing 11 between the slider 9 and roller 10 of the slide roller assembly 16 in the axial direction. Accordingly, the needle bearing 11 operates normally without allowing a skew phenomenon to occur in its needles and permits the roller 10 to roll smoothly in the transmission groove 5. Owing to the smooth operations of the respective elements in this manner, any vibration due to frictional resistance does not occur, thus allowing an efficient torque transmission between both the transmission shafts 1, 2.

Moreover, since the slide roller assembly 16 is formed of the slider 9, the roller 10 and the needle bearing 12 as main elements, the number of parts of the assembly can be relatively small, making the structure simple and relatively light-weighted.

Furthermore, since the cylindrical slider 9 is provided with the chamfers 17 on its inner peripheral edges at axial opposite ends, even if the slider 9 is formed of a short axial length, it can slide smoothly relative to the trunnion 8 without causing a pinching. The slider 9 can thus be formed extremely short thereby to make the slide roller assembly 16 compact.

Additionally, the axial coupling means 12 between the slider 9 and the roller 10 is formed of washers 13, 13 and cir-clips 14, 14 so that its structure can be simple and the slide roller assembly 16 can be mounted easily by merely forming the slider 9 slightly longer than the roller 10 in the axial direction.

It should be noted that various modifications in design may be made to the above-described embodiment without departing from the invention as defined in the claims. For example, though in the embodiment the joint J has been illustrated as a tripod type having three trunnions 8, it can instead be formed as a bipod type having two trunnions.

What is claimed is:

1. A slide type universal joint for connecting two transmission shafts which can cross each other at an angle, comprising:

a hollow cylindrical outer member connected to one of the transmission shafts and having at an inner peripheral surface thereof a plurality of circumferentially spaced, axially extending transmission grooves, each said transmission groove having circumferentially opposed arcuate side walls;

an inner member connected to the other of the transmission shafts and having a plurality of radially extending cylindrical trunnions so as to project into said transmission grooves, respectively;

rollers carried on said respective trunnions and rollably engaged at outer peripheral surfaces of the rollers in the arcuate side walls of the corresponding transmission grooves, each outer peripheral surface having an arcuate cross section;

a cylindrical slider is fitted around each of said trunnions and is slidably around an outer peripheral surface of the trunnion and the roller is rotatably carried on an outer periphery of said slider via a needle bearing, and wherein chamfers are provided on inner peripheral edges of said slider at axial opposite ends thereof; and an axial coupling means for axially coupling said slider and said roller to each other thereby forming a slide roller assembly, wherein said axial coupling means comprises washers opposed to and placed in contact with axial end surfaces of said roller, and retaining rings retained in annular grooves formed on an outer peripheral surface of said slider and abutted against outer side surfaces of said washers.

* * * * *